(12) United States Patent
Park

(10) Patent No.: US 9,937,976 B2
(45) Date of Patent: Apr. 10, 2018

(54) MUTUALLY LINKABLE BICYCLES

(71) Applicant: BICBUDDY CO., LTD., Gyeonggi-do (KR)

(72) Inventor: Min Sik Park, Gyeonggi-do (KR)

( * ) Notice: Subject to any disclaimer, the term of this patent is extended or adjusted under 35 U.S.C. 154(b) by 19 days.

(21) Appl. No.: 14/916,537

(22) PCT Filed: Aug. 26, 2014

(86) PCT No.: PCT/KR2014/007943
§ 371 (c)(1),
(2) Date: Mar. 3, 2016

(87) PCT Pub. No.: WO2015/034201
PCT Pub. Date: Mar. 12, 2015

(65) Prior Publication Data
US 2016/0194048 A1    Jul. 7, 2016

(30) Foreign Application Priority Data

Sep. 3, 2013  (KR) .................. 10-2013-0105717

(51) Int. Cl.
| | |
|---|---|
| *B62K 3/12* | (2006.01) |
| *B62K 3/14* | (2006.01) |
| *B62K 13/02* | (2006.01) |
| *B62K 19/30* | (2006.01) |
| *B62K 13/00* | (2006.01) |
| *B62K 21/00* | (2006.01) |

(52) U.S. Cl.
CPC ............... *B62K 13/02* (2013.01); *B62K 3/12* (2013.01); *B62K 13/00* (2013.01); *B62K 19/30* (2013.01); *B62K 21/00* (2013.01)

(58) Field of Classification Search
CPC . B62K 3/12; B62K 3/14; B62K 13/00; B62K 13/02; B62K 13/025; B62K 13/08; B62K 15/00; B62K 2015/001; B62K 19/30; B62K 21/00
USPC .................................................. 280/272, 239
See application file for complete search history.

(56) References Cited

U.S. PATENT DOCUMENTS

| 516,115 A | * | 3/1894 | Roberts .................. B62K 21/08 |
| | | | 280/272 |
| 589,336 A | * | 8/1897 | Carlson .................. B62K 21/08 |
| | | | 280/272 |

(Continued)

FOREIGN PATENT DOCUMENTS

| JP | 5021726 | 9/2012 |
| KR | 1019990033140 | 5/1999 |

(Continued)

*Primary Examiner* — Joseph M Rocca
*Assistant Examiner* — Maurice L Williams
(74) *Attorney, Agent, or Firm* — IPLA P.A.; James E. Bame

(57) ABSTRACT

A clutch means includes an immobile tube (60) disposed between a top tube (2) and a head tube (6) of a bicycle frame, with a bearing portion (20) mounted to one of the facing end portions and axially supporting the end portions, whereby the top tube (2) and the immobile tube (60) are disposed so as to be capable of relative rotation. In the outer periphery of the bearing portion (20) and the immobile tube (60) axially supported therein, pin holes (22, 62) are respectively opened. The pin holes (22, 62) are bored at positions that are centrally aligned when a front fork (4) of the bicycle is are linearly positioned.

2 Claims, 4 Drawing Sheets

(56) References Cited

U.S. PATENT DOCUMENTS

| | | | | |
|---|---|---|---|---|
| 2,103,674 | A | * | 12/1937 | Jackson .................... B62H 5/06 280/272 |
| 4,458,908 | A | | 7/1984 | Strong |
| 5,492,033 | A | * | 2/1996 | Hopey .................... B62K 21/08 280/272 |
| 5,743,543 | A | | 4/1998 | Chiu |
| 5,975,551 | A | * | 11/1999 | Montague ............ B62K 15/006 180/220 |
| 6,450,519 | B1 | * | 9/2002 | Wang .................... B62K 21/00 280/266 |
| 8,342,546 | B2 | * | 1/2013 | Bryant .................... B62K 21/08 280/272 |
| 2003/0132599 | A1 | * | 7/2003 | Yu ............................ B62M 1/38 280/274 |
| 2003/0178806 | A1 | * | 9/2003 | Nelson ..................... B62H 5/02 280/204 |
| 2005/0043147 | A1 | * | 2/2005 | Huang ................... B62K 13/00 482/57 |
| 2008/0136137 | A1 | * | 6/2008 | Huang ................... B62K 21/00 280/272 |
| 2011/0187072 | A1 | * | 8/2011 | Park ........................ B60T 7/102 280/204 |

FOREIGN PATENT DOCUMENTS

| KR | 20080096141 | 10/2008 |
|---|---|---|
| WO | WO02/26554 | 4/2002 |
| WO | WO2006/080855 | 8/2006 |

\* cited by examiner

MUTUALLY LINKABLE BICYCLES

BACKGROUND

The present invention relates to a multi-seat bicycle, and more particularly, to a mutually linkable bicycle that a plurality of single-seat bicycles are consecutively connected to each other in tandem, thereby being selectively used as a multi-seat bicycle or a normal single-seat bicycle which is separated from another single-seat bicycle.

There are various kinds of single-seat bicycles and multi-seat bicycles which are eco-friendly riding means traveling by a rider's power without any fuel.

As an example, a multi-seat bicycle which has a plurality of saddles and pedals disposed at predetermined portions of a long frame so that many riders can ride on the bicycle has been disclosed. As another example, the patent reference 1 discloses a single-seat bicycle that can be used as a bicycle built for two riders when a half frame having only a rear wheel is connected to the rear of the single-seat bicycle. Moreover, the patent reference 2 discloses a multi-seat bicycle that two single-seat bicycles are connected to each other in the longitudinal direction or in the transverse direction via an attachment.

As another example, the patent reference 3 discloses single-seat bicycles that can be transformed into a multi-seat bicycle by being connected to each other in tandem.

Such a bicycle is apparently identical with the normal single-seat bicycle because having a front fork, a head tube, a rear fork, a top tube, a seat tube and a down tube are arranged at predetermined portions of a frame. However, in order to use the bicycle as a multi-seat bicycle, a plurality of the single-seat bicycles are arranged in tandem, all single-seat bicycles except the foremost bicycle allow the front wheel separated from the front fork, and then, each of the front forks are axially supported on the rear fork of the former bicycle to be connected with one another so that the plurality of the bicycles are sequentially connected to one another in a line.

However, the front fork of the bicycle extends forward obliquely, and hence, it is impossible that the multi-seat bicycle travels normally. That is, during travelling, the front fork of the latter bicycle always moves together with the rear fork of the former bicycle. In this instance, during steering, there is little change in the rear fork of the former bicycle, but the front fork of the latter bicycle is changed in slope direction. Therefore, it is impossible that the multi-seat bicycle travels normally because the frame connected with the front fork receives torsion power acting in the counter-steering direction.

The above-mentioned problem has been solved by the patent reference 4 that has been proposed by the same inventor as the present invention. In the patent reference 4, a frame of the bicycle is divided into a front part which is connected to a handle and a rear part which is connected to a rear fork, clutch means is interposed between the front part and the rear part and a synchronizer is mounted between the front fork and the front part of the frame so that the front part and the rear part of the frame are connected to each other into one or provide an intermittent action to separate the front part from the rear part for relative rotation, and the relative rotation is automatically controlled by the synchronizer according to an steering angle of the bicycle. However, the bicycle has a disadvantage in that it is difficult to manufacture because the structure of the clutch means is very complicated.

Patent References

[Patent Reference 1] PCT Patent Publication No. WO2002/26554
[Patent Reference 2] PCT Patent Publication No. WO2006/080855
[Patent Reference 3] Korean Patent Publication No. 101999-0033140
[Patent Reference 4] Korean Patent No. 10-869602

Accordingly, the present invention has been made in an effort to solve the above-mentioned problems occurring in the prior arts, and it is an object of the present invention to provide a mutually linkable bicycle that a frame of the bicycle is divided into a front part and a rear part and the front part and the rear part are regulated by clutch means so as to transform a plurality of single-seat bicycles into a multi-seat bicycle when the single-seat bicycles are consecutively connected to each other, and that includes a synchronizer interposed between a front fork of the bicycle and the front part of the frame so as to prevent the bicycle from being turned down by torsion of the frame of the latter bicycle when the bicycle is used as the multi-seat bicycle, thereby providing a very simple structure of the clutch means.

To achieve the above objects, the present invention provides a mutually linkable bicycle which includes an immobile tube interposed between a top tube and a head tube of a frame to divide the frame into two and a bearing portion mounted at an end portion of the top tube or the immobile tube to axially support the opposed end portions so that the top tube and the immobile tube are disposed so as to be capable of relative rotation, comprising: pin holes which are respectively formed in the outer periphery of the bearing portion and in the outer periphery of the end portion axially supported therein in such a way as to coincide with each other when a front fork of the bicycle is put in a line; and clutch means which is formed when a fixing pin is inserted into the two coinciding pin holes in such a way as to be freely inserted or drawn out and which is mounted between the top tube and the immobile tube.

Moreover, the mutually linkable bicycle further comprises: a reinforcing shaft which is mounted inside the top tube or the immobile tube; a stopper which is fixed at the outer periphery of the reinforcing shaft and is spaced slightly apart from the end of the top tube or the immobile tube; a stop ring which is interposed between the stopper and the end of the top tube or the immobile tube and is fixed by a set screw; and means for preventing the bearing portion from being separated from the opposed end portions axially supported by the bearing portion.

Furthermore, the mutually linkable bicycle further comprises: a screw portion which is mounted at the end of the fixing pin; and a synchronizer having a nut which is attached to the inner face of the front fork and to which the screw portion is spirally inserted, so as to control relative rotation of the top tube according to rotation of the head tube.

Additionally, the mutually linkable bicycle further comprises: a hand-grip which is formed integrally to the fixing pin to be bent at almost 90 degrees and has a fixing protrusion formed at the end of the outer periphery thereof; and a synchronizer having a clamp which is attached to the inner face of the outer periphery of the front fork to tighten the hand-grip of the fixing pin, so as to control relative rotation of the top tube according to rotation of the head tube.

The mutually linkable bicycle according to the present invention has a very simple structure that a fixing pin is inserted into or removed from pin holes of a top tube and a fixed tube mounted to do relative rotation and includes clutch means for converting a state between the fixed tube and the top tube into a clutch state that the top tube can be rotated relative to the fixed tube or into an un-clutch state that the top tube cannot be rotated, thereby reducing manufacturing costs of the bicycles.

Additionally, the mutually linkable bicycle according to the present invention includes a synchronizer configured by a free end of the fixing pin which penetrates through a guide ring of the bottom side of the outer periphery of a bearing portion and a screw portion of the other end which is spirally inserted into a front fork, thereby simplifying handling of the fixing pin.

Figure 1:
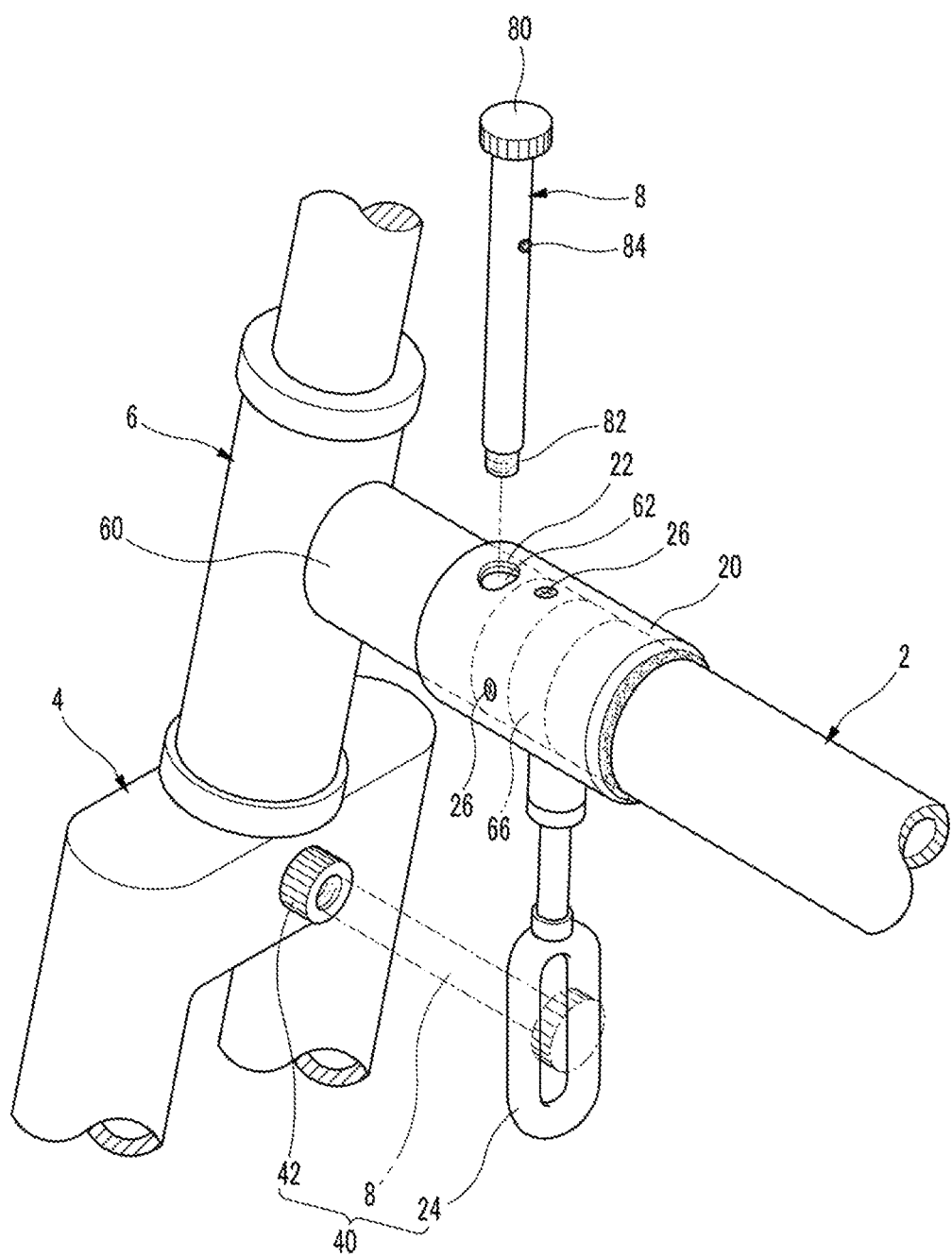
FIG. 1 is a partially perspective view of a bicycle according to a preferred embodiment of the present invention.

<Explanation of essential reference numerals in drawings>

| 2: top tube | 20: bearing portion |
|---|---|
| 22: pin hole | 24: guide ring |
| 4: front fork | 40: synchronizer |
| 42: nut | 44: clamp |
| 46: clamp lever | 6: head tube |
| 60: immobile tube | 62: pin hole |
| 64: reinforcing shaft | 66: stopper |
| 68: stop ring | 8: fixing pin |
| 80: hand-grip | 82: screw portion |
| 84: ball plunger | 820: fixing protrusion |

DETAILED DESCRIPTION OF THE INVENTION

Reference will be now made in detail to the preferred embodiment of the present invention with reference to the attached drawings.

Embodiment 1

FIG. 1 illustrates an assembled state of a top tube 2, a front fork 4 and a head tube 6 of a frame which are essential parts of a mutually linkable bicycle according to the present invention.

As shown in FIG. 1, a bearing portion 20 which is larger in diameter than an immobile tube 60 of the head tube 6 facing the bearing portion 20 is formed at the front end of the top tube 2 to axially support the end portions of the immobile tube 60. Pin holes 22 and 62 are respectively formed on the outer peripheries of the bearing portion 20 and the immobile tube 60. The pin holes 22 and 62 are bored at positions that the pin holes 22 and 62 coincide with each other when the front fork 4 of the bicycle is put in a straight line.

Moreover, the bearing portion 20 is formed integrally with the end of the immobile tube 60 of the head tube 6, and the front end of the top tube facing is axially supported by the bearing portion 20.

In the meantime, a fixing pin 8 is inserted into the pin holes 22 and 62, which coincide with each other when the front fork 5 is put in a straight line, in such a way as to be freely inserted and removed. By virtue of the effect that the fixing pin 8 is inserted into and removed from the pin holes, a state between the top tube 2 and the head tube 6 can be controlled into a clutch state that the top tube 2 cannot rotate relative to the head tube 6 or into an un-clutch state that the top tube 2 can rotate relative to the head tube 6, so that the bicycle can be transformed into a single-seat bicycle in the clutch state or into a multi-seat bicycle in the un-clutch state.

As another example of the fixing pin 8, the fixing pin 8 may include a hand-grip 80 attached to the top of the fixing pin to make it easy to use and a screw portion 82 formed at a lower end of the opposite side.

The fixing pin 8 is used as an assembling part for the synchronizer 40 by the screw portion 82.

In other words, in this embodiment, the synchronizer 40 includes: a nut 42 attached to the inner face of the outer periphery of the front fork 4; a guide ring 24 attached to the bottom side of the outer periphery of the bearing portion 20; and the fixing pin 8 drawn out of the pin hole 22 and 62. As indicated by the dashed dotted line of FIG. 1, when the fixing pin 8 is inserted into the guide ring 24 to penetrate the guide ring 24 and the screw portion 82 of the end is spirally inserted into the nut 42, the synchronizer 40 which synchronizes and interworks by connection of the fixing pin 8 and the guide ring 24 with each other is mounted between the top tube 2 and the front fork 4, and at the same time, the state between the top tube 2 and the immobile tube 60 is converted into the un-clutch state for relative rotation, so that the bicycle can be used as the multi-seat bicycle.

In a case of the multi-seat bicycle, during a curved traveling, when a rider steers a handle, because the fixing pin 8 is rotated at the same angle as the steering angle of the handle and a turning angle is controlled in line with the top tube 2 of the latter bicycle by a synchronization action for interworking the guide ring 24, a rotation angle difference between the top tube 2 and the immobile tube 60 is naturally dissipated, and then, the bicycle can show a normal curve traveling.

In this embodiment, the synchronizer 40 is arranged between the top tube 2 and the front fork 4, but it is not essential. For instance, if a rider is skillful in operation of the mutually linkable bicycle according to the present invention, the rider may not feel difficulty in operation even though there is no synchronizer 40.

Figure 2:
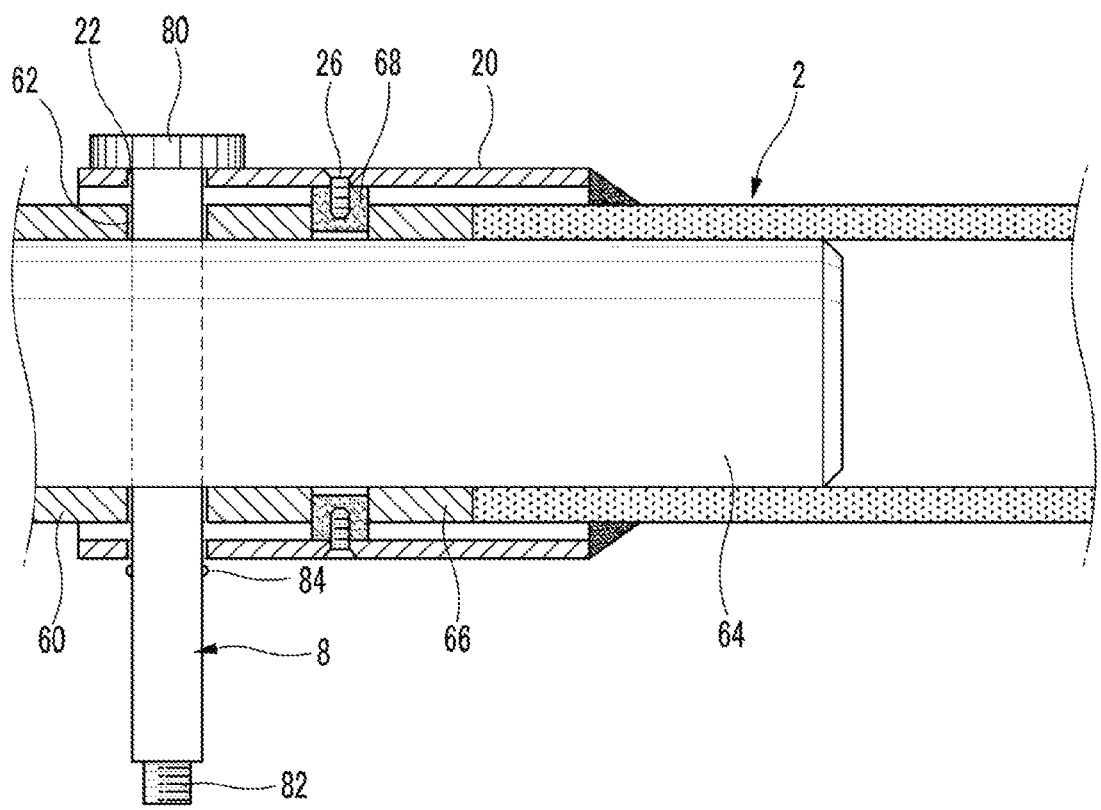
FIG. 2 is a side sectional view of FIG. 1.

In this embodiment, the immobile tube 60 should not be separated from the bearing portion 20 between the top tube 2 and the head tube 6. FIG. 2 shows a preferable connection structure between the top tube 2 and the head tube 6.

As shown in FIG. 2, a reinforcing shaft 64 is fixed integrally with the inner center of the immobile tube 60, and a pin hole extending from the pin hole 62 penetrates through the reinforcing shaft 64. The bearing portion 20, the immobile tube 60 and the reinforcing shaft 64 are connected with one another by the fixing pin 8.

Furthermore, a stopper 66 is fixed on the outer periphery of the reinforcing shaft 64 and is spaced slightly apart from the end of the immobile tube 60. A stop ring 68 is axially inserted between the end of the immobile tube 60 and the stopper 66 and is fixed by a set screw 26 inserted from the outer periphery of the bearing portion 20, so as to support the immobile tube 60 not to be separated from the bearing portion 20.

Additionally, the stop ring 68 is axially inserted into the reinforcing shaft 64 to come into contact with the end of the immobile tube 60 earlier than the stopper 66. Next, the stopper 66 is fit into the reinforcing shaft 64, and then, is axially supported by the bearing portion 20 in a state where the stopper 66 is fixed integrally with the reinforcing shaft 64 by welding. After that, the set screw 26 is spirally inserted from the outer periphery to fix the stop ring 68.

Then, the immobile tube 60 and the reinforcing shaft 64 are axially supported to be freely rotate inside the bearing portion 20 and the stop ring 68 axially supports the stopper 66 not to be separated, so that the top tube 2 and head tube 6 can do relative rotation.

In the drawings, unexplained reference numeral 84 is a ball plunger for fixing the fixing pin 8, which is mounted in the bearing portion 20, to prevent unintentional separation of the fixing pin 8 during traveling.

The mutually linkable bicycle according to the present invention is provided as a general single-seat bicycle when it is sold.

That is, the present invention is a single-seat bicycle that the fixing pin 8 of FIG. 1 penetrates through the two pin holes 22 and 62 and the top tube 2 and the immobile tube 60 are connected to each other integrally.

When the present invention is used as the single-seat bicycle, it is the same as the normal bicycle. However, in order to the bicycle as a multi-seat bicycle, front wheels (not shown) are removed from all bicycles except the foremost bicycle, and the front fork 4 of each bicycle is axially supported to an axle of the rear fork of the former bicycle so that the bicycles are connected to each other integrally.

Continuously, before the multi-seat bicycle travels, the fixing pins 8 of all bicycles except the foremost bicycle are removed from the bearing portion 20. As indicated by the dash dotted line of FIG. 1, when the screw portion 82 of the end is inserted into the guide ring 24 and is spirally inserted into the nut 42 of the front fork 4, the synchronizer 40 is mounted.

At the time of curve traveling of the multi-seat bicycle, a difference in slope angle arises between the rear fork of the former bicycle and the front fork 4 of the latter bicycle axially supported on the axle of the rear fork. However, in the present invention, the difference in slope angle is dissipated by relative rotation between the immobile tube 60 and the top tube 2, and at the same time, the synchronizer 40 properly controls the relative rotation of the top tube 2 to the immobile tube 60, so that all of the latter bicycles can travel normally without being turned down.

Furthermore, the mutually linkable bicycle according to the present invention includes means for regulating the state between the top tube 2 and the immobile tube 60 into a rotatable state or into a non-rotatable state. The means for regulating the state between the top tube 2 and the immobile tube 60 has an extremely simple structure including two pin holes 22 and 62 which coincide with each other when the front fork 4 of the bicycle is put in a straight line and a fixing pin 8 penetrating through the two pin holes 22 and 62.

Embodiment 2

In this embodiment, the synchronizer 40 has a structure that the screw portion 82 of the fixing pin 8 is spirally inserted into the nut 42 of the front fork 4, but such a structure has a risk that the connected portion is easy to break when an external force is applied to the screw portion 82 during synchronization.

Figure 3:
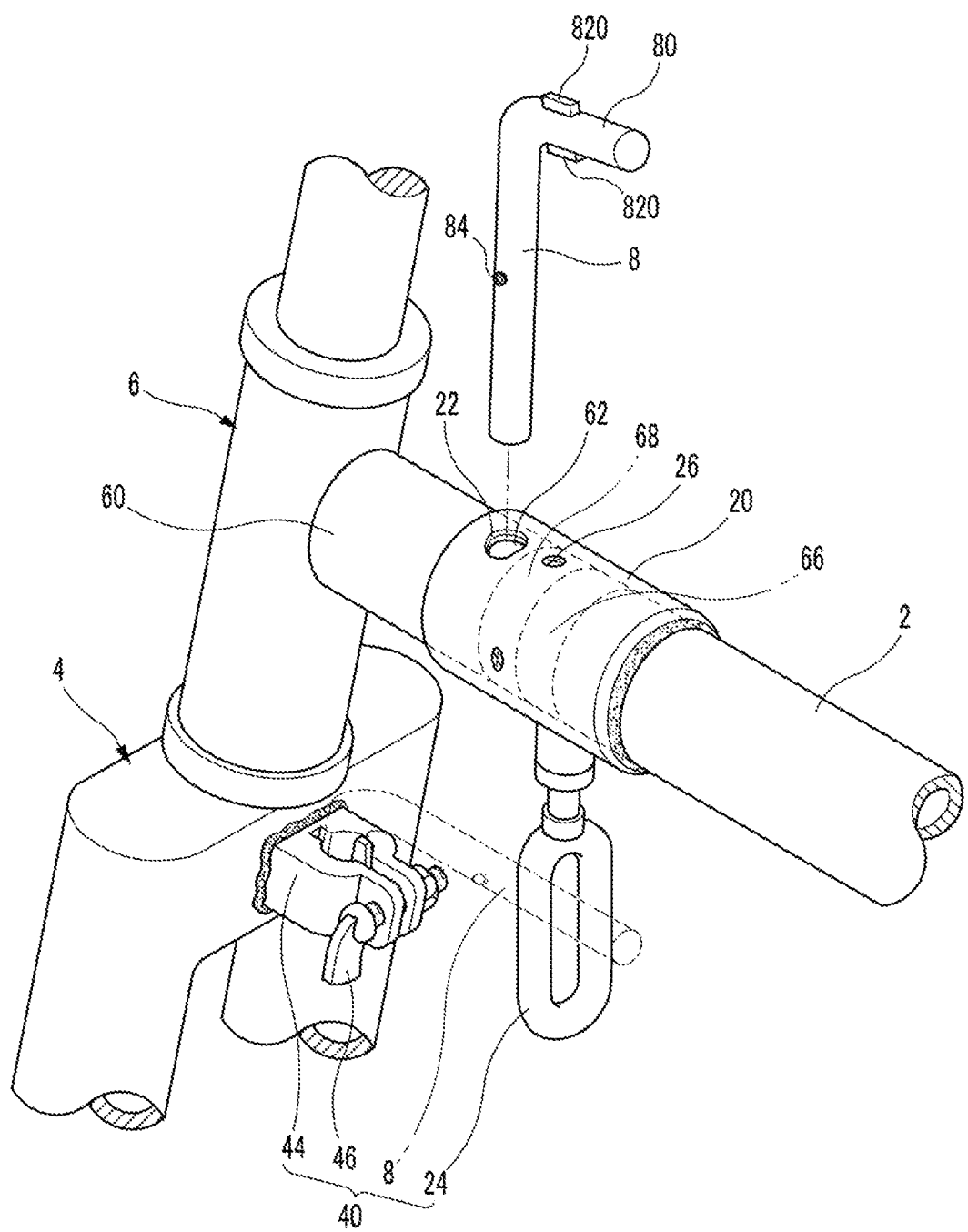
FIG. 3 is a partially perspective view of a bicycle according to another preferred embodiment of the present invention.

FIG. 3 is a partially perspective view of a bicycle according to another preferred embodiment of the present invention. In this embodiment, the fixing pin 8 includes a hand-grip 80 which is bent at almost 90 degrees and a fixing protrusion 820 formed on the outer periphery of the hand-grip 80 in the axial direction.

Moreover, a clamp 44 instead of the nut 42 is fixed on the inner face of the front fork 4. The clamp 44 has a clamp lever 46 for tightening or releasing the hand-grip 80 of the fixing pin 8 fit into the clamp 44 by a cam action.

According to the above-mentioned structure, because the fixing protrusion 820 is connected to the clamp 44 by the clamp lever 46 in a state where the fixing protrusion 820 is matched with an empty space inside the clamp 44 when the hand-grip 80 is fit into the clamp 44, the hand-grip 80 is firmly fastened to the clamp 44 without being moved laterally.

Also in another embodiment of the mutually linkable bicycle according to the present invention, like the above-mentioned embodiment, the mutually linkable bicycle provides the clutch action that the fixing pin 8 is inserted into the two pin holes 22 and 62 and the top tube 2 and the immobile tube 60 are connected to each other integrally, and provides the synchronizer 40 that is formed when the fixing pin 8 drawn out of the pin holes 22 and 62 is inserted and fit into the clamp 44 in such a manner that the end bent at almost 90 degrees penetrates through the guide ring 24.

In the meantime, in the mutually linkable bicycle according to the present invention, a down tube of the frame may be omitted like the bicycle disclosed in Korean Patent No. 869602 proposed by the same inventor as the present invention, or may be connected to a middle side of the top tube 2 to make relative rotation between the top tube 2 and the immobile tube 60.

Figure 4:
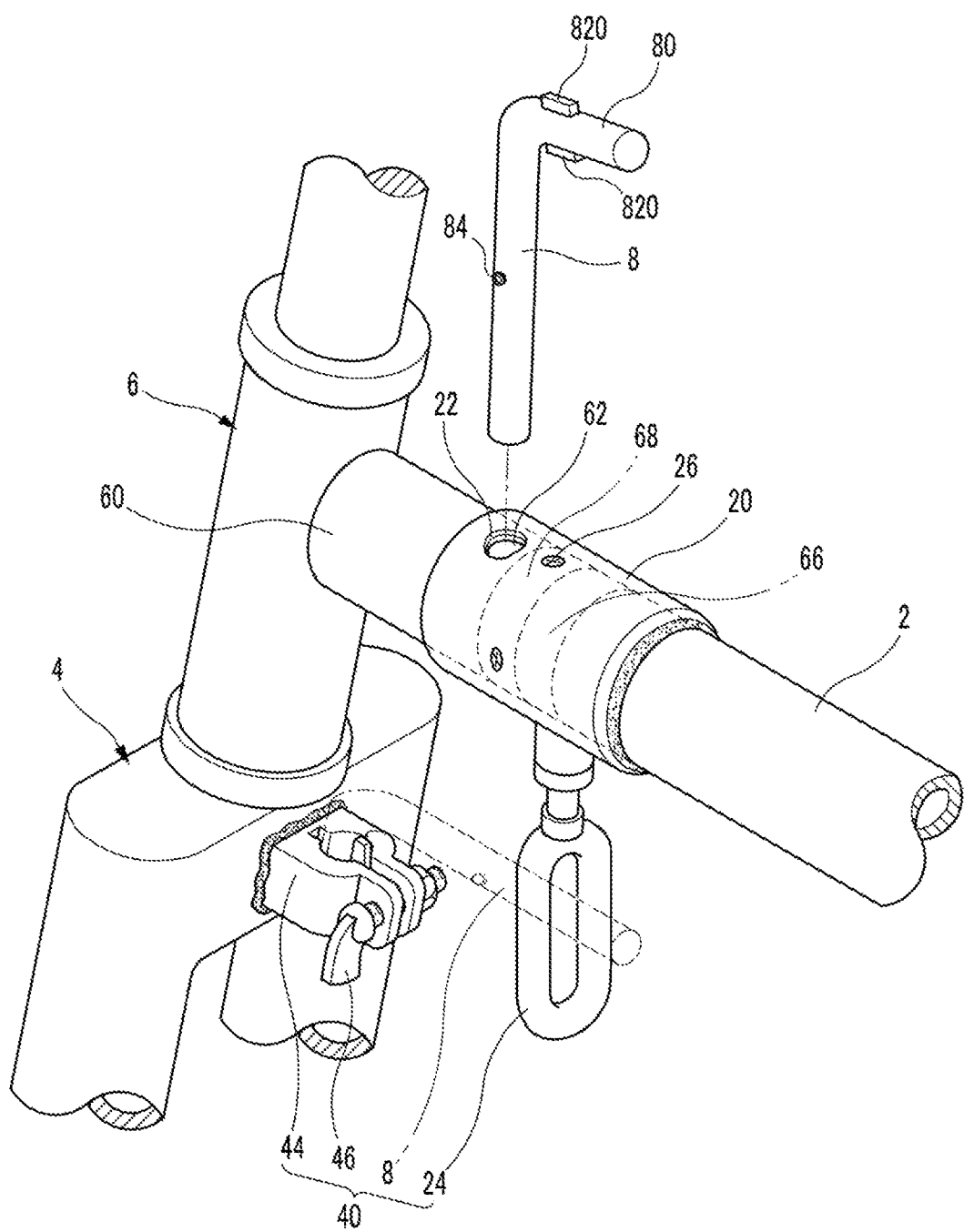
FIG. 4 is a partially perspective view of a bicycle for women to which the present invention is applied.

Additionally, the mutually linkable bicycle according to the present invention enables a rider to easily ride on. As shown in FIG. 4, the mutually linkable bicycle according to the present invention can be applied to bicycles for women in which the top tube 2 is omitted and the down tube of a lower part is directly connected to the head tube 6.

In FIG. 4, the frame structure is omitted because it does not fit for mounting the synchronizer 40. However, if the bicycle is designed in such a manner that the center of the frame is located at the lower part and relative rotation between the immobile tube 60 and the bearing portion 20 is made within a predetermined angle, the latter bicycles can always travel in a stable condition by a downward central action. In addition, even at the time of curve traveling, because a traveling trouble of the bicycle is dissipated while the immobile tube 60 rotates to the bearing portion 20 at a predetermined angle, any of the latter bicycles is not turned down during traveling.

As described above, the mutually linkable bicycle according to the present invention can be used as bicycles for leisure because it can be transformed into a normal single-seat bicycle or a multi-seat bicycle that a plurality of the single-seat bicycles are connected to each other in tandem.

The invention claimed is:

1. A mutually linkable bicycle which includes an immobile tube interposed between a top tube and a head tube of a frame to divide the frame into two and a bearing portion mounted at an end portion of the top tube or the immobile tube to axially support the opposed end portions so that the top tube and the immobile tube are disposed so as to be capable of relative rotation, the mutually linkable bicycle comprising:
   pin holes which are respectively formed in the outer periphery of the bearing portion and in the outer periphery of the end portion axially supported therein in such a way as to coincide with each other when a front fork of the bicycle is put in a line;

clutch means which is formed when a fixing pin is inserted into the two coinciding pin holes in such a way as to be freely inserted or drawn out and which is mounted between the top tube and the immobile tube;

a screw portion which is mounted at the end of the fixing pin; and a synchronizer having a nut which is attached to the inner face of the front fork and to which the screw portion is spirally inserted, so as to control relative rotation of the top tube according to rotation of the head tube.

2. A mutually linkable bicycle according to claim 1, which includes an immobile tube interposed between a top tube and a head tube of a frame to divide the frame into two and a bearing portion mounted at an end portion of the top tube or the immobile tube to axially support the opposed end portions so that the top tube and the immobile tube are disposed so as to be capable of relative rotation, the mutually linkable bicycle comprising:

pin holes which are respectively formed in the outer periphery of the bearing portion and in the outer periphery of the end portion axially supported therein in such a way as to coincide with each other when a front fork of the bicycle is put in a line;

clutch means which is formed when a fixing pin is inserted into the two coinciding pin holes in such a way as to be freely inserted or drawn out and which is mounted between the top tube and the immobile tube;

a hand-grip which is formed integrally to the fixing pin to be bent at almost 90 degrees and has a fixing protrusion formed at the end of the outer periphery thereof; and a synchronizer having a clamp which is attached to the inner face of the outer periphery of the front fork to tighten the hand-grip of the fixing pin, so as to control relative rotation of the top tube according to rotation of the head tube.

* * * * *